United States Patent [19]
Cooper

[11] Patent Number: 6,035,129
[45] Date of Patent: Mar. 7, 2000

[54] OPTICAL FILM ENCODER FOR CAMERA

[75] Inventor: Andrew T. Cooper, Fairport, N.Y.

[73] Assignee: Eastman Kodak Company, Rochester, N.Y.

[21] Appl. No.: 09/260,454

[22] Filed: Mar. 2, 1999

[51] Int. Cl.[7] ............................. G03B 17/02; G03B 17/24
[52] U.S. Cl. ................. 396/6; 396/315; 396/317
[58] Field of Search ................... 396/310, 311, 396/313, 314, 315, 316, 317, 318, 6

[56] References Cited

U.S. PATENT DOCUMENTS

| | | | |
|---|---|---|---|
| 4,705,372 | 11/1987 | Lapeyre | 396/318 |
| 5,095,324 | 3/1992 | Alyfuku et al. | 396/315 |
| 5,311,228 | 5/1994 | Stoneham et al. | 396/315 |
| 5,331,361 | 7/1994 | Jones | 396/182 |
| 5,574,521 | 11/1996 | Constable et al. | 396/315 |
| 5,619,737 | 4/1997 | Horning et al. | 396/195 |
| 5,689,743 | 11/1997 | Horning et al. | 396/316 |
| 5,717,968 | 2/1998 | Stephenson, III et al. | 396/315 |
| 5,740,479 | 4/1998 | Soma et al. | 396/176 |
| 5,870,639 | 2/1999 | Constable et al. | 396/315 |
| 5,933,663 | 8/1999 | Kikuchi | 396/315 |
| 5,946,508 | 8/1999 | Ito | 396/297 |

*Primary Examiner*—Eddie C. Lee
*Attorney, Agent, or Firm*—Roger A. Fields

[57] ABSTRACT

An optical film encoder for recording discrete data bits on a length of film, includes a single light source capable of receiving electrical current to produce artificial light; at least two light emission openings positioned to individually emit artificial light produced by the light source, to record respective data bits on the length of film; a light intensity-reducing filter positioned to reduce the intensity of artificial light that can be emitted from one of the openings, but not from the other opening; and a current limiting device capable of reducing the intensity of artificial light produced by the light source to allow the filter to reduce the intensity of artificial light that can be emitted from the one opening at least sufficiently to prevent the light from recording a data bit on the length of film, whereby only the light to be emitted from the other opening will record a data bit on the length of film.

6 Claims, 5 Drawing Sheets

OPTICAL FILM ENCODER FOR CAMERA

INCORPORATION BY REFERENCE

Reference is made to commonly assigned U.S. Pat. No. 5,870,639, entitled OPTICAL DATA RECORDING CIRCUIT FOR A PHOTOGRAPHIC CAMERA and issued Feb. 9, 1999 in the name of Douglas W. Constable.

The patent is incorporated into this application.

FIELD OF THE INVENTION

The invention relates generally to the field of photography, and in particular to cameras. More specifically, the invention relates to an optical film encoder for recording discrete data bits on a length of film in a photographic camera such as a one-time-use camera.

BACKGROUND OF THE INVENTION

Film and cameras that are all in one, commonly referred to as single-use or one-time-use cameras, have become well known. The one-time-use camera is a simple point-and-shoot type comprising an opaque plastic main body part which supports a conventional film cartridge in a cartridge receiving chamber, an unexposed film roll prewound from the film cartridge onto a film take-up spool in a film supply chamber, a backframe opening between the cartridge receiving and film supply chambers for exposing successive frames of the filmstrip, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable frame counter for indicating the number of exposures remaining to be made on the filmstrip, a direct see-through viewfinder having front and rear viewfinder lenses, and in some models an electronic flash. A pair of opaque plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed frame of the filmstrip into the film cartridge and moves a fresh frame of the filmstrip from the unexposed film roll to the backframe opening. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

One-time-use cameras, as well as reloadable cameras, for the new "Advanced Photo System" can give you not just one print format, but a choice of three print formats. For the classic proportions of a 35 mm print, the photographer chooses the "C" format. For a wider view, the full-frame "H" format is chosen. And for an even wider look, the "P" format is chosen to provide a sweeping panoramic print. The camera records the choice of print format magnetically and/or optically on one longitudinal edge of the filmstrip for each exposed frame on the filmstrip. The standard encodement on film for the "H" format is the binary 0, 0, i.e. no recorded data bits. The standard encodement on film for the "P" format is either the binary 0, 1 or the binary 1, 0, i.e. one recorded data bit. The standard encodement on film for the "C" format is the binary 1, 1, i.e. two recorded data bits.

During photofinishing to make prints for the customer, the photofinisher's equipment reads the optical or magnetic encodements on film, and automatically prints each print in the encoded "C", "H" or "P" format. A "C" format print is typically 4×6 inches. An "H" format print is typically 4×7 inches. And a "P" format print is typically 4×10 inches or 4×11.5 inches. No matter which format "C", "H" or "P" is selected in the camera, the exposed frames on the filmstrip are always in the "H" format. This allows re-prints to be made in any of the three formats rather than just in the selected format.

The photographer will know how much of the subject being photographed will be included in the "C", "H" or "P" format print because the viewfinder in the camera typically includes a variable state masking device, such as a mechanical masking blade or an electronic masking liquid crystal display, for framing the subject according to the particular format that is selected. A manually operated format selector is provided to change the state of the masking device to the view the desired format in the viewfinder and to record the choice of format magnetically and/or optically on one longitudinal edge of the filmstrip for each exposed frame on the filmstrip.

Prior Art Problem

Typically, to record the choice of print format optically on the filmstrip, the camera includes two light-emitting diodes such as shown in incorporated U.S. Pat. No. 5,870,639, in U.S. Pat. No. 5,619,737 and in U.S. Pat. No. 5,574,521. A flash charge storage capacitor in an electronic flash is used to apply stored charge energy to one, both, or none of the light-emitting diodes in order to optically record the standard encodement for the "P" format or for the "C" format, i.e. one or two recorded data bits, on the filmstrip, or alternatively to leave the standard encodement for the "H" format, i.e. no recorded data bits, on the filmstrip. Respective switches selectively shunt the light-emitting diodes to establish the choice of "P", "C" or "H" format.

Another way to record the choice of print format optically on the filmstrip is for the camera to include only one light-emitting diode, two light emission openings positioned to individually emit the light produced by the light emitting diode, and a mask moveable to block one, none, or both of the openings to optically record the standard encodement for the "P" format or for the "C" format on the filmstrip, or alternatively to leave the standard encodement for the "H" format on the filmstrip. See U.S. Pat. No. 5,740,479 and incorporated U.S. Pat. No. 5,870,639.

It is a continuing goal in the manufacture of one-time-use cameras to make them as low cost as is reasonably possible. Thus, the elimination of one of the light-emitting diodes in the first example, and the elimination of the movable mask in the second example, is a worthy pursuit.

SUMMARY OF THE INVENTION

An optical film encoder for recording discrete data bits on a length of film, comprising a single light source capable of receiving electrical current to produce artificial light;

at least two light emission openings positioned to individually emit artificial light produced by the light source, to record respective data bits on the length of film;

a light intensity-reducing filter positioned to reduce the intensity of artificial light that can be emitted from one of the openings, but not from the other opening; and a current limiting device capable of reducing the intensity of artificial light produced by the light source to allow the filter to reduce the intensity of artificial light that can be emitted from the one opening at least sufficiently to prevent the light from recording a data bit on the length of film, whereby only the light to be emitted from the other opening will record a data bit on the length of film.

DETAILED DESCRIPTION OF THE INVENTION

The invention is disclosed as being embodied preferably in a one-time-use camera with an electronic flash. Because the features of a one-time-use camera with an electronic flash are generally known, the description which follows is directed in particular only to those elements forming part of or cooperating directly with the disclosed embodiment. It is to be understood, however, that other elements may take various forms known to a person of ordinary skill in the art.

Figure 1:
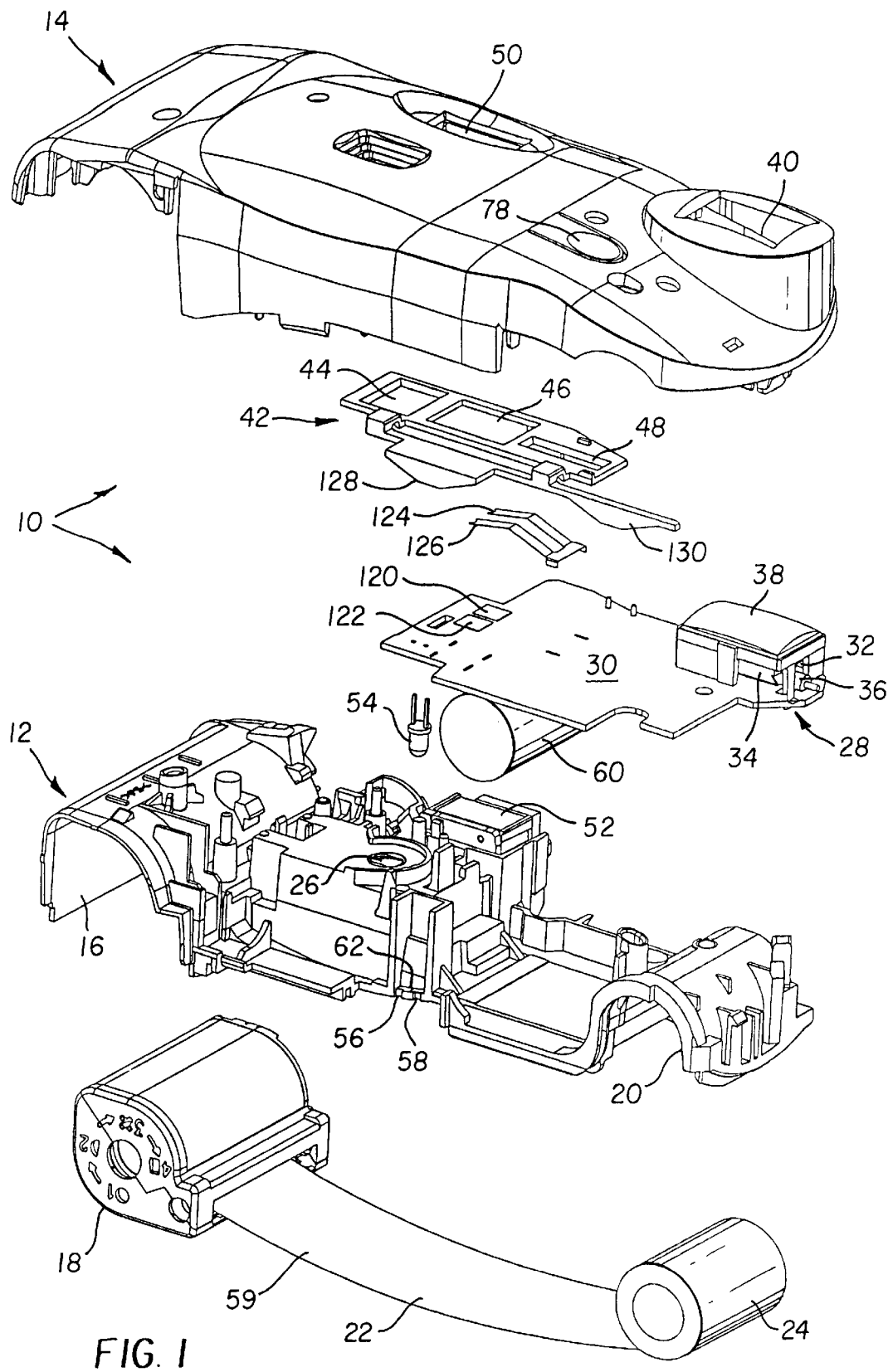
FIG. 1 is an exploded front and bottom perspective view of a one-time-use camera with an optical film encoder for recording discrete data bits on a filmstrip in the camera, according to a preferred embodiment of the invention.
Figure 2:
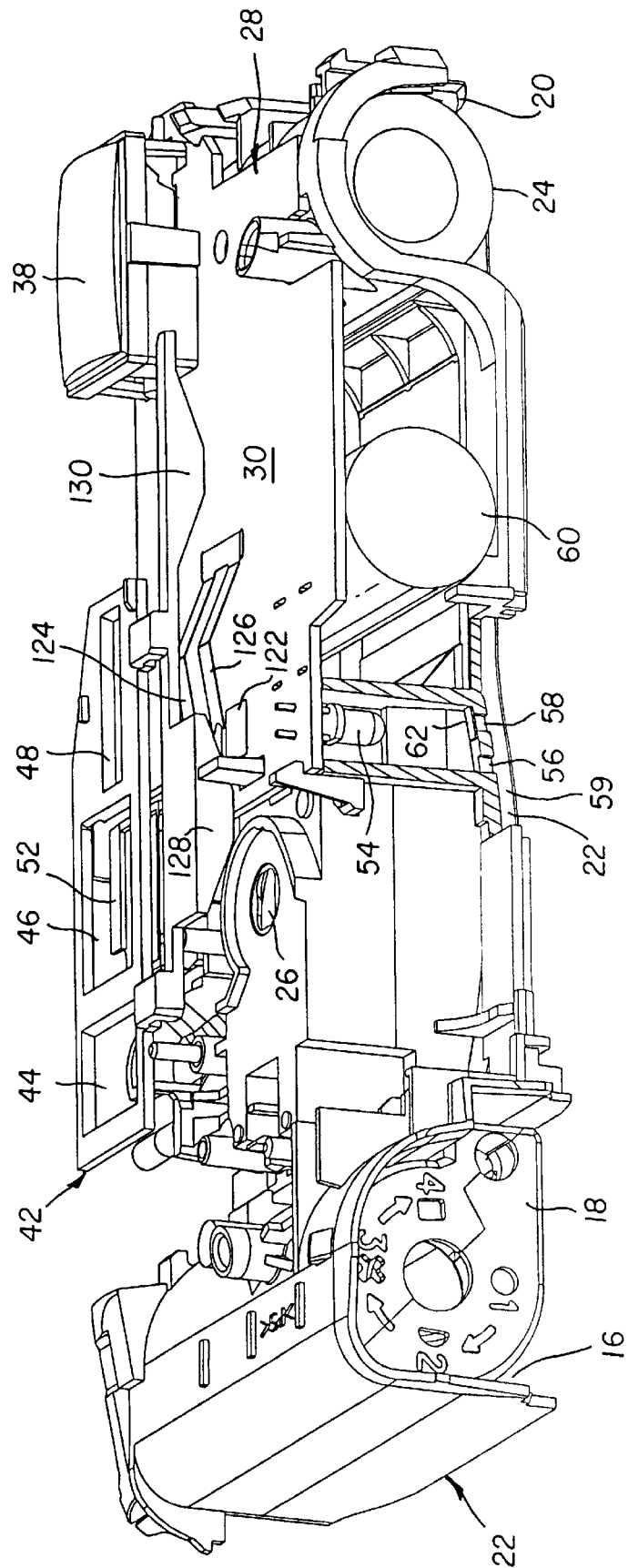
FIG. 2 is an assembled front and bottom perspective view of the camera.

Referring now to the drawings, FIGS. 1 and 2 partially show a one-time-use camera 10 which includes a plastic opaque main body part 12, a plastic opaque front cover part 14, and a plastic opaque rear cover part (not shown). The front cover part 14 and the rear cover part house the main body part between them and are connected to one another and to the main body part 12 via known hook-in-hole connections (not shown) such as disclosed in prior art U.S. Pat. No. 5,815,740 issued Sep. 29, 1998, and prior art U.S. Pat. No. 5,349,510 issued Sep. 20, 1994.

As is known, the main body part 12 has a rearwardly open cartridge receiving chamber 16 for a conventional "Advanced Photo System" film cartridge 18 and a rearwardly open film supply chamber 20 for a rotatably supported film supply spool (not shown). See FIGS. 1 and 2.

During manufacture, a filmstrip 22 is prewound from the film cartridge 18 into an unexposed film roll 24 in the film supply spool. A rearwardly open backframe opening (not shown) is located between the cartridge receiving chamber 16 and the film supply chamber 20 for exposing successive frames of the filmstrip 22 when ambient light is received through a front aperture 26 in the main body part 12.

A film winding thumbwheel (not shown), rotatably supported on the main body part 12, protrudes outwardly from a slot (not shown) in the rear cover part and has a depending coaxial stem in coaxial engagement with an exposed top end (not shown) of a film spool inside the film cartridge 20. Manual winding rotation of the film winding thumbwheel, clockwise in FIGS. 1 and 2, similarly rotates the film spool inside the film cartridge 20 to wind each exposed frame of the filmstrip 22 into the film cartridge and to move a fresh frame of the filmstrip from the unexposed film roll 24 to the backframe opening.

Figure 3:
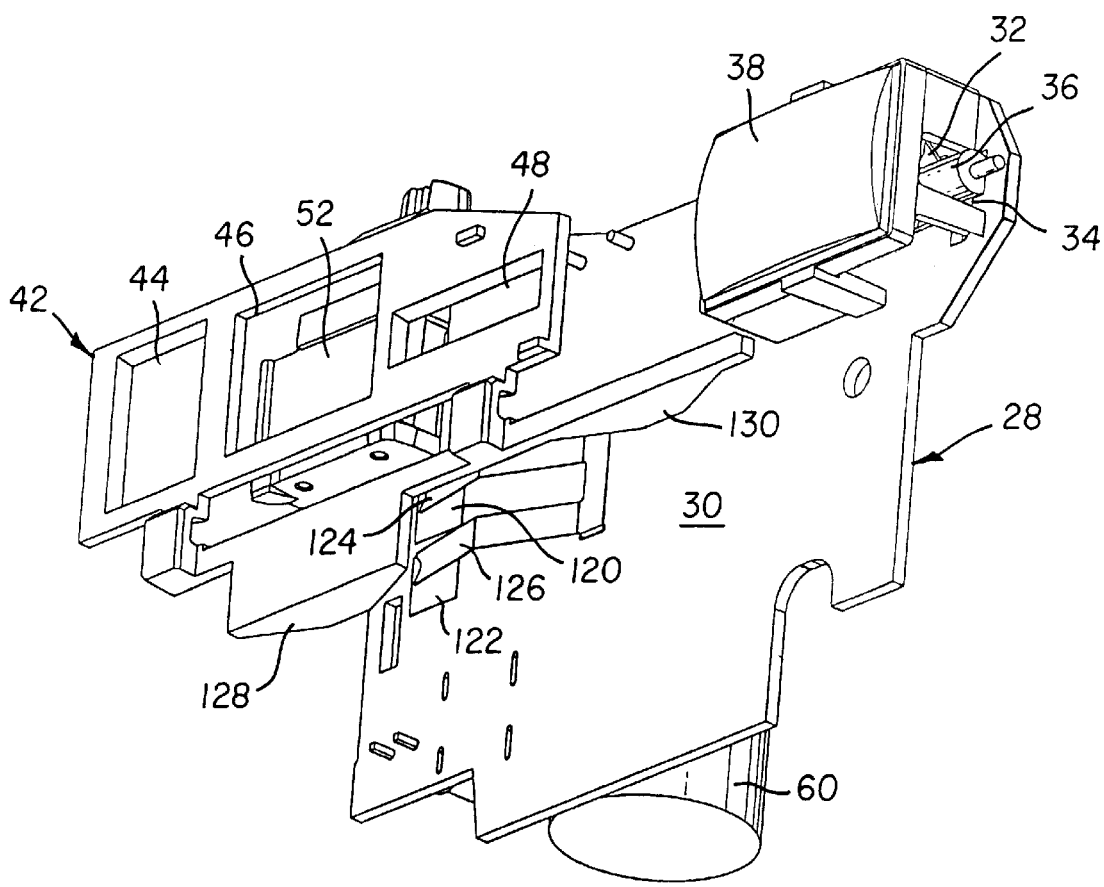
FIG. 3 is a front and bottom perspective view of a viewfinder masking device in the camera.

A built-in electronic flash 28 comprises a generally flat flash circuit board 30 supported on the main body part 12, a concave-shaped flash reflector 32 located (partly) in a rectangular hole 34 in the flash circuit board, a flash illumination-producing flash tube 36 positioned rearmost within the flash reflector against an inner side of the flash reflector, and a light-transmitting transparent (or alternately translucent) plastic flash cover-lens 38 positioned over a front open end of the flash reflector. See FIGS. 1–3. The flash cover-lens 38 is located within a flash opening 40 in the front cover part 14.

A viewfinder masking device 42 has a "C" format opening 44, an "H" format opening 46 and a "P" format opening 48, and is supported for translation on the inside of the front cover part 14 to manually move any one of the openings between a front viewfinder opening 50 in the front cover part and a front viewfinder lens 52 on the main body part 12. When any one of the "C", "H" or "P" format openings 44, 46 and 48 is located between the front viewfinder opening 50 and the front viewfinder lens 52, the through-the-viewfinder view of the subject to be photographed is framed in accordance with the selected format.

Figure 4:
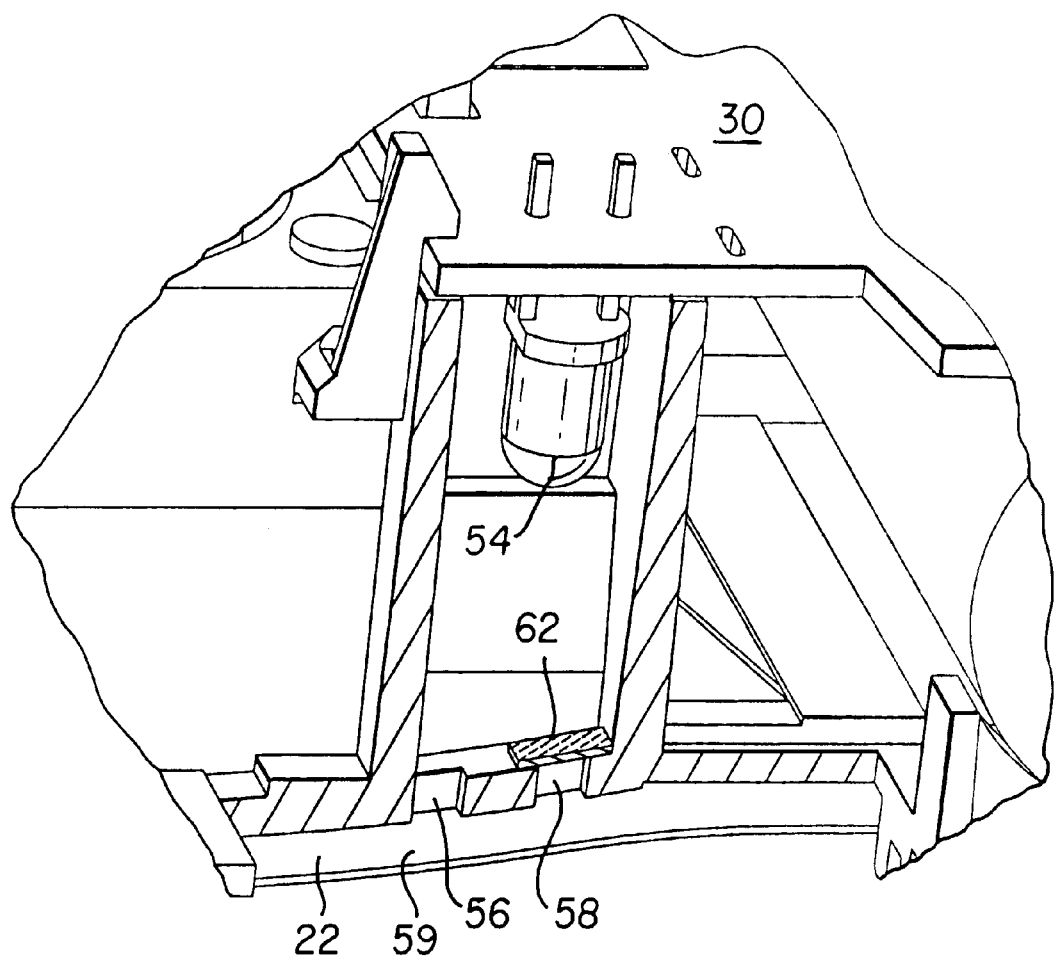
FIG. 4 is a front and bottom perspective view of the optical film encoder in the camera.

A single light-emitting diode 54 is supported on the flash circuit board 30 facing a rearward pair of light emission openings 56 and 58 in the main body part 12. See FIGS. 1, 2 and 4. The two light emission openings 56 and 58 are positioned adjacent the backframe opening in the main body part 12 to individually emit artificial light produced by the light-emitting diode 54, to record respective data bits on one longitudinal edge 59 of the filmstrip 24 for any exposed frame on the filmstrip. A flash charge storage capacitor 60 is supported on the flash circuit board 30 to apply stored charge energy to the light-emitting diode 54, for the light-emitting diode to produce a maximum intensity (brightness) of artificial light.

The standard encodement on film for the "H" format is the binary 0, 0, i.e. no recorded data bits. The standard encodement on film for the "P" format is either the binary 0, 1 or the binary 1, 0, i.e. one recorded data bit. The standard encodement on film for the "C" format is the binary 1, 1, i.e. two recorded data bits.

A neutral density filter 62 is positioned over the light emission opening 58 to reduce the intensity of the artificial light that can be emitted from that opening, by means of the light-emitting diode 54. The filter 62 has a value of "1.0", which means that the filter allows only 50% of the incident light to pass through the filter.

Figure 5:
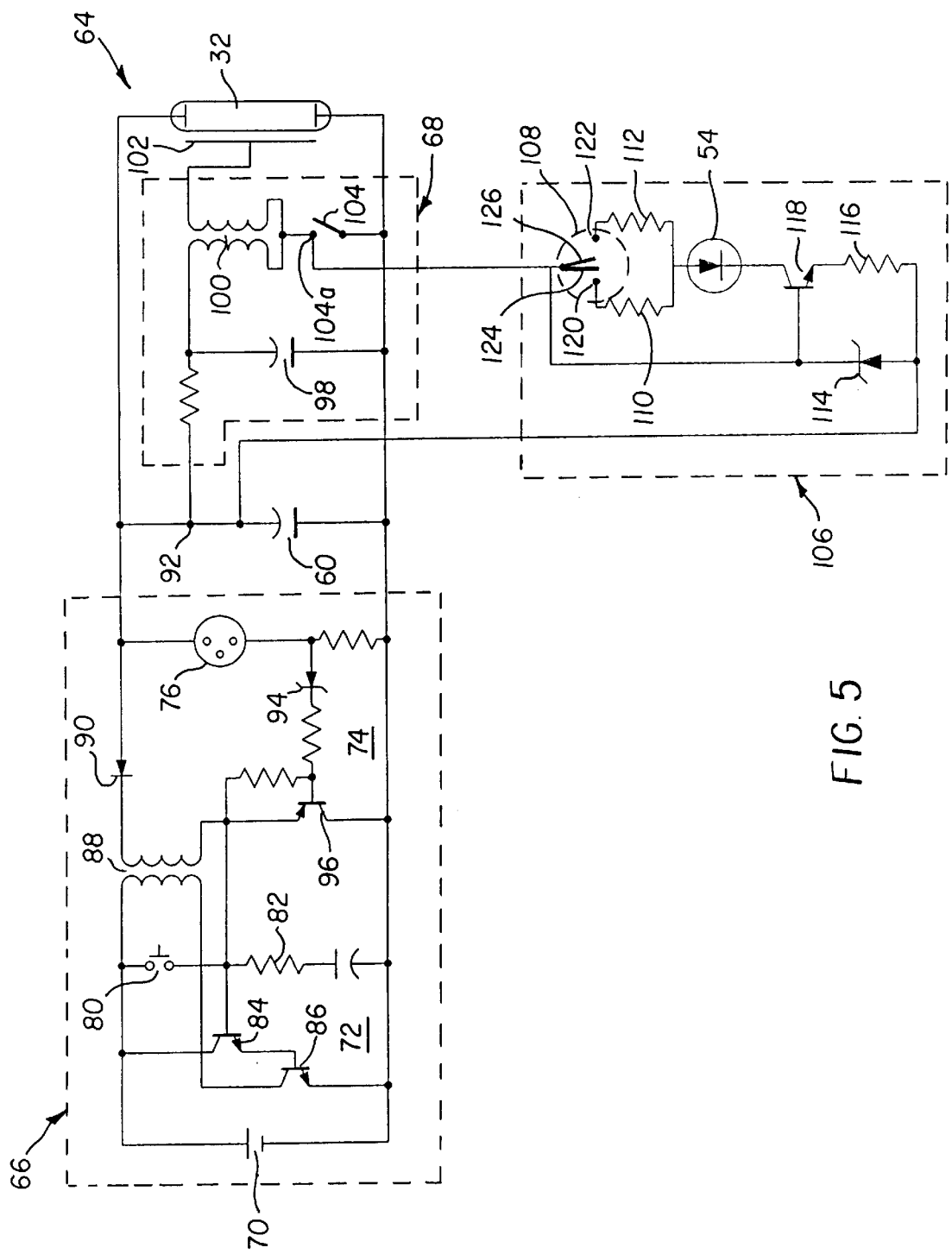
FIG. 5 is a circuit diagram of a flash circuit and encoder circuit in the camera.

A known flash circuit 64 on the flash circuit board 30, identical to the one disclosed in incorporated U.S. Pat. No, 5,870,639, includes a flash energy supply circuit 66, the flash charge storage capacitor 60, a flash trigger circuit 68, and the flash tube 32. See FIG. 5.

The flash energy supply circuit 66 comprises a battery 70, a self-oscillating flash charger sub-circuit 72, and an oscillation arresting sub-circuit 74. A neon ready-light 76 provides a visual indication of when charge to the flash charge storage capacitor 60 has reached a sufficiently high charge to fire the flash tube 32.

Operation of the self-oscillating flash charger sub-circuit 72 begins when a flash charging button 78 on the front cover part 14 is manually depressed. This effects closing of a normally open momentary switch 80, which establishes current flow from the battery 70 through a resistor 82 to the respective bases of a pair of high gain transistors 84 and 86, and in turn initiates current flow through the primary winding of a charging transformer 88. The induced stepped up voltage in the secondary winding of the transformer 88 is fed back to the base of the transistor 84 to continue the current flow in the primary winding of the transformer. When the transformer 88 saturates, the current flow in its secondary winding reverses, turning off current flow to the base of the transistor 84. This completes a cycle of oscillation. Noise in the base of the transistor 84 caused by the changing field in the secondary winding of the transformer 88 is sufficient to initiate conduction in the transistor 84, thereby starting the cycle of oscillation over again. The transistors 84 and 86 provide enough loop gain to sustain the oscillations whether the momentary switch 80 is open or closed.

The oscillatory current flow in the secondary winding of the transformer 88 is rectified by a rectifier diode 90 and charges the flash charge storage capacitor 60 to a negative voltage at the terminal 92. Charging of the flash charge storage capacitor 60 continues until the self oscillation of the self-oscillating flash charger sub-circuit 72 is terminated by the operation of the oscillation arresting sub-circuit 74, which includes a 110 v zener diode 94 and a PNP transistor switch 96. When the voltage across the flash charge storage capacitor 60 reaches −270 v at the terminal 92, the neon ready-light 76 begins to conduct, illuminating the ready-light and providing a visible indication there is sufficient charge on the storage capacitor to initiate a flash exposure. When the ready-light 76 conducts, the voltage drop across the ready light falls to 220 v, leaving a voltage of −70 v at the terminal 92. Charging of the flash charge storage capacitor 60 continues until the voltage at the terminal 92 reaches −330 v. When the flash charge storage capacitor 60 is thus fully charged, the zener diode 94 begins to conduct, applying current to the base of the PNP transistor switch 96, thereby switching the transistor switch "on". This grounds the base of the transistor 84, in turn arresting the self-oscillations in the self-oscillating flash charger sub-circuit 72 and terminating further charging of the flash charge storage capacitor 60.

The flash trigger circuit 68 is conventional and its operation is well known. Briefly, the flash trigger circuit 68 includes a trigger capacitor 98, a transformer 100, a flash tube trigger electrode 102 and a shutter-flash synchronization switch 104. In operation, the synchronization switch 104 is momentarily closed by a shutter mechanism (not shown) at the proper time in the flash exposure sequence. The trigger capacitor 98 discharges through the primary winding of the transformer 98, inducing a high voltage on the trigger electrode 102 which ionizes the gas in the flash tube 32. The flash charge storage capacitor 60 then discharges through the flash tube 32, exciting the gas and producing the desired flash illumination. A high-value isolation resistor 106 is provided to maintain the dc charge voltage across the trigger capacitor 98 at the same level as the flash charge storage capacitor 60, while minimizing current drain on the latter capacitor during the flash trigger operation.

An optical data recording circuit 106 comprises the single light-emitting diode 54, a multi-mode switch 108, a high-value (4800 ohms) current limiting resistor 110, a comparatively low-value (300 ohms) resistor 112, and a 12 v zener diode 114 coupled across a resistor 116 and the base-emitter junction of a transistor 118 to form a constant current source for the light-emitting diode. The high value of the current limiting resistor 110 is specifically chosen to reduce the intensity of artificial light produced by the light-emitting diode 54 in order to allow the neutral density filter 62 to reduce the intensity of artificial light that can be emitted from the one opening 58 at least sufficiently to prevent the light from recording a data bit on the longitudinal edge 59 of the filmstrip 22. The light-emitting diode 54 is connected at one end indirectly to a normally open contact 104a of the shutter-flash synchronization switch 104 and at another end indirectly to the terminal 92, The multi-mode switch 108 has a conductive pad 120 connected to the high-value resistor 110, a conductive pad 122 connected to the low-value resistor 112, and a pair of flexible switch-fingers 124 and 126. The two switch fingers 124 and 126 are constructed to be individually bent against the respective pads 120 and 122 to make selective contact with the two pads in order to separately shunt the light emitting-diode 54. See FIGS. 1–3 and 5.

The viewfinder masking device 42 has one cam 128 for bending the switch finger 126 against the pad 122 and another separate cam 130 for bending the switch finger 124 against the pad 120. See FIGS. 1–3.

When the viewfinder masking device 42 is translated to manually move the "C" format opening 44 between the front viewfinder opening 50 and the front viewfinder lens 52, the cam 128 bends the switch finger 126 against the pad 122. The cam 130 does not bend the switch finger 124 against the pad 120. As a result, the low-value resistor 112, but not the high-value current limiting resistor 110, is used in the optical data recording circuit 106. When the shutter-flash synchronization switch 104 is momentarily closed, the stored charge voltage from the flash charge storage capacitor 60 is briefly applied to the optical data recording circuit 106. Current flows through the zener diode 114, establishing a fixed 12 v bias potential at the base of the transistor 118 which causes a constant collector-emitter current flow through the transistor and the resistor 116 to the light-emitting diode 54. The light-emitting diode 54 then produces artificial light. The high-value current limiting resistor 110 cannot act to reduce the intensity of the light produced by the light-emitting diode 54. Thus, the light is emitted from the opening 58 as well as from the opening 56 to record respective data bits on the longitudinal edge 59 of the filmstrip 22. The two recorded data bits constitute the "C" format encodement the binary 1, 1.

When the viewfinder masking device 42 is translated to manually move the "P" format opening 44 between the front viewfinder opening 50 and the front viewfinder lens 52, the cam 130 bends the switch finger 124 against the pad 120. The cam 128 does not bend the switch finger 126 against the pad 122. As a result, the high-value current limiting resistor 110, but not the low-value resistor 112, is used in the optical data recording circuit 106. When the shutter-flash synchronization switch 104 is momentarily closed, the stored charge voltage from the flash charge storage capacitor 60 is briefly applied to the optical data recording circuit 106. Current flows through the zener diode 114, establishing a fixed 12 v bias potential at the base of the transistor 118 which causes a constant collector-emitter current flow through the transistor and the resistor 116 to the light-emitting diode 54. The light-emitting diode 54 then produces artificial light. The high-value current limiting resistor 110 acts to reduce the intensity of the light produced by the light-emitting diode 54. Thus, the light is emitted from the opening 56, but not from the opening 58, and only one data bit is recorded on the longitudinal edge 59 of the filmstrip 22. The recorded data bit in one instance and the absence of a recorded data bit in the other instance constitutes the "P" format encodement the binary 1, 0.

When the viewfinder masking device 42 is translated to manually move the "H" format opening 46 between the front viewfinder opening 50 and the front viewfinder lens 52, the respective cams 128 and 130 are spaced from the switch fingers 126 and 124. See FIGS. 1–3. Thus, neither one of the switch fingers is bent against the respective pads 122 and 120 and the light-emitting diode 54 is not shunted. In this instance, no data bits are recorded on the longitudinal edge 59 of the filmstrip 22. The absence of any recorded data bits constitutes the "H" format encodement the binary 0, 0.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. front cover part
16. cartridge receiving chamber
18. film cartridge
20. film supply chamber
22. filmstrip
24. unexposed film roll
26. front aperture
28. electronic flash
30. flash circuit board
32. flash reflector
34. hole
36. flash tube
38. flash cover-lens
40. flash opening
42. viewfinder masking device
44. "C" format opening
46. "H" format opening
48. "P" format opening
50. front viewfinder opening
52. front viewfinder lens
54. light-emitting diode
56. light emission opening
58. light emission opening
59. longitudinal film edge
60. flash charge storage capacitor
62. neutral density filter
64. flash circuit
66. flash energy supply circuit
68. flash trigger circuit
70. battery
72. self-oscillating flash charger sub-circuit
74. oscillation arresting sub-circuit
76. neon ready-light
78. flash charging button
80. momentary switch
82. resistor
84. transistor
86. transistor
88. charging transformer
90. rectifier diode
92. terminal
94. zener diode
96. PNP transistor switch
98. trigger capacitor
100. transformer
102. flash tube trigger electrode
104. shutter-flash synchronization switch
104a. open contact
106. optical data recording circuit
108. multi-mode switch
110. high-value current limiting resistor
112. low-value resistor
114. zener diode
116. resistor
118. transistor
120. conductive pad
122. conductive pad
124. switch-finger
126. switch finger
128. cam
130. cam

What is claimed is:

1. An optical film encoder for recording discrete data bits on a length of film, comprising a single light source capable of receiving electrical current to produce artificial light;

at least two light emission openings positioned to individually emit artificial light produced by said light source, to record respective data bits on the length of film;

a light intensity-reducing filter positioned to reduce the intensity of artificial light that can be emitted from one of said openings, but not from the other opening; and a current limiting device capable of reducing the intensity of artificial light produced by said light source to allow said filter to reduce the intensity of artificial light that can be emitted from said one opening at least sufficiently to prevent the light from recording a data bit on the length of film, whereby only the light to be emitted from said other opening will record a data bit on the length of film.

2. An optical film encoder as recited in claim 1, wherein said light intensity-reducing filter is a neutral density filter.

3. An optical film encoder as recited in claim 1, wherein said current limiting device is a current limiting resistor.

4. An optical film encoder as recited in claims 1 or 3, wherein a multi-mode switch has a first mode for disconnecting a current source and said light source to prevent said light source from producing artificial light that can be emitted from said openings to record respective data bits on the length of film, a second mode for connecting the current source to said light source and to said current limiting device to allow ambient light produced from said light source only to be emitted from said other opening to record a data bit on the length of film, and a third mode for connecting the current source to said light source and not to said current limiting device to allow ambient light produced from said light source to be emitted from said one opening and from said other opening to record respective data bits on the length of film.

5. An optical film encoder as recited in claim 4, wherein a viewfinder masking device has three different formats and is supported for movement to select any one of said formats and to change the particular mode of said switch in accordance with a selected format.

6. A one-time-use camera comprising:

a length of film;

a single light source capable of receiving electrical current to produce artificial light;

at least two light emission openings positioned to individually emit artificial light produced by said light source, to record respective data bits on said length of film;

a light intensity-reducing filter positioned to reduce the intensity of artificial light that can be emitted from one of said openings, but not from the other opening; and a current limiting device capable of reducing the intensity of artificial light produced by said light source to allow said filter to reduce the intensity of artificial light that can be emitted from said one opening at least sufficiently to prevent the light from recording a data bit on said length of film, whereby only the light to be emitted from said other opening will record a data bit on said length of film.

* * * * *